United States Patent
Kogure

(10) Patent No.: US 7,171,297 B2
(45) Date of Patent: Jan. 30, 2007

(54) ROAD SURFACE CONDITION DETERMINATION APPARATUS

(75) Inventor: Masaru Kogure, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 343 days.

(21) Appl. No.: 10/921,222

(22) Filed: Aug. 19, 2004

(65) Prior Publication Data
US 2005/0065700 A1 Mar. 24, 2005

(30) Foreign Application Priority Data
Aug. 26, 2003 (JP) .......................... P2003-302001

(51) Int. Cl.
*G01M 17/02* (2006.01)
*G06F 19/00* (2006.01)
(52) U.S. Cl. ..................... 701/80; 701/73; 701/79; 340/444; 73/9
(58) Field of Classification Search ................ 701/78, 701/80, 74, 79, 89, 91, 93; 340/444; 73/146, 73/9, 146.5
See application file for complete search history.

(56) References Cited

U.S. PATENT DOCUMENTS

| | | | |
|---|---|---|---|
| 5,092,662 A | | 3/1992 | Okubo |
| 5,521,594 A | * | 5/1996 | Fukushima .................. 340/901 |
| 5,539,640 A | * | 7/1996 | Kishimoto et al. ........... 701/40 |
| 6,260,935 B1 | * | 7/2001 | Abe et al. .................... 303/196 |
| 6,266,602 B1 | * | 7/2001 | Yamaura ..................... 701/80 |
| 6,385,525 B2 | * | 5/2002 | Watanabe et al. ............. 701/80 |
| 6,556,912 B2 | * | 4/2003 | Matsuno ..................... 701/80 |
| 6,577,941 B2 | * | 6/2003 | Kawasaki et al. ............ 701/70 |
| 6,640,623 B2 | * | 11/2003 | Ono et al. .................... 73/146 |
| 2001/0029421 A1 | | 10/2001 | Watanabe et al. |

FOREIGN PATENT DOCUMENTS

| | | |
|---|---|---|
| EP | 0 795 448 A2 | 9/1997 |
| JP | 11-230867 | 8/1999 |
| WO | WO 02/20319 A1 | 3/2002 |

OTHER PUBLICATIONS

European Search Report, dated Dec. 10, 2004.

* cited by examiner

*Primary Examiner*—Tan Q. Nguyen
(74) *Attorney, Agent, or Firm*—McGinn IP Law Group, PLLC

(57) ABSTRACT

A comparison/determination part 7 recieves the input of a front wheel speed filtered value $\omega fF$ from a front wheel speed filtered value calculation part 5 and a rear wheel speed filtered value $\omega rF$ from a rear wheel speed filtered value calculation part 6. It is determined whether the front wheel speed filtered value $\omega fF$ has exceeded a preset first threshold $C1$. It is determined whether the rear wheel speed filtered value $\omega rF$ has exceeded a preset second threshold $C2$ within a time for transmission of vibration from the front wheels to the rear wheels which is experimentally set in advance after the front wheel speed filtered value $\omega fF$ exceeded the first threshold $C1$. The road surface is then determined to be rough when it is determined that the rear wheel speed filtered value $\omega rF$ has exceeded the preset second threshold $C2$.

8 Claims, 3 Drawing Sheets

ROAD SURFACE CONDITION DETERMINATION APPARATUS

BACKGROUND OF THE INVENTION

The present invention relates to a road surface condition determination apparatus for a vehicle, which accurately detects the condition of a road, in particular, a rough road including a bumpy road.

Recent vehicles carry a controller which estimates parameters indicating the condition of a road surface such as a road surface frictional coefficient and which performs accurate control of vehicle behaviors such as control of four wheel driving and automatic brake control using the estimated parameters.

It is therefore important to estimate the parameters indicating the condition of a road surface such as a road surface frictional coefficient accurately in order to perform accurate control over various behaviors of a vehicle. Since it is difficult to estimate a road surface frictional coefficient when the road is rough, the detection of roughness of a road surface is an important technique in recognizing the condition of the road surface.

For example, according to JP-A-11-230867, an examination is carried out on a front wheel at which a road surface frictional coefficient has been calculated as a low µ attributable to icing to see whether the calculated value of a road surface frictional coefficient originates from a slip on a bumpy or rough road by comparing the slip ratio at the time of calculation of the road surface frictional coefficient and the slip ratio of the rear wheel on the same side at the same slipping position as the front wheel to see any change in the ratio.

However, the technique for identifying a roughness on a road surface according to JP-A-11-230867 has a problem in that it requires a long checking time because a roughness cannot be identified until the slip ratio of a rear wheel increases after an increase in the slip ratio of a front wheel. For example, when a vehicle having a wheel base of about 2.6 m travels at a speed of 15 km/h, such identification takes about 620 m(sec), which makes it difficult to perform control with high response. According to JP-A-11-230867, since the slip ratio of a front wheel and the slip ratio of a rear wheel are compared, a slip of wheels on a road having a low µ can be erroneously determined as attributable to a rough road.

SUMMARY OF THE INVENTION

The invention has been made taking the above-described situation into consideration, and it is an object of the invention to provide a road surface condition determination apparatus for a vehicle capable of accurately and quickly determining a roughness of a road surface without any additional sensor or complicated calculation process and without erroneously determining even a road having a low µ as a roughness on a road surface.

In order to resolve the object, a road surface condition determination apparatus according to the invention includes: wheel speed detection means which detects wheel speeds; front wheel speed change calculation means which calculates a change in the speed of front wheels; rear wheel speed change calculation means which calculates a change in the speed of rear wheels; front wheel speed change determination means which determines whether the change in the speed of the front wheels has exceeded a first preset threshold; rear wheel speed change determination means which determines whether the change in the speed of the rear wheels has exceeded a second present threshold within a preset time for transmission of vibration from the front wheels to the rear wheels after the change in the speed of the front wheels exceeded the first threshold; and determination means which determines that the road surface as is rough when the rear wheel speed change determination means determines that the change in the speed of the rear wheels has exceeded the present second threshold.

The road surface condition determination apparatus according to the invention allows a roughness of a road surface to be accurately and quickly determined without any additional sensor or complicated calculation process and without erroneously determining even a road having a low µ as a roughness on a road surface.

DESCRIPTION OF THE PREFERRED EMBODIMENT

An embodiment of the invention will now be described with reference to the drawings.

Figure 1:
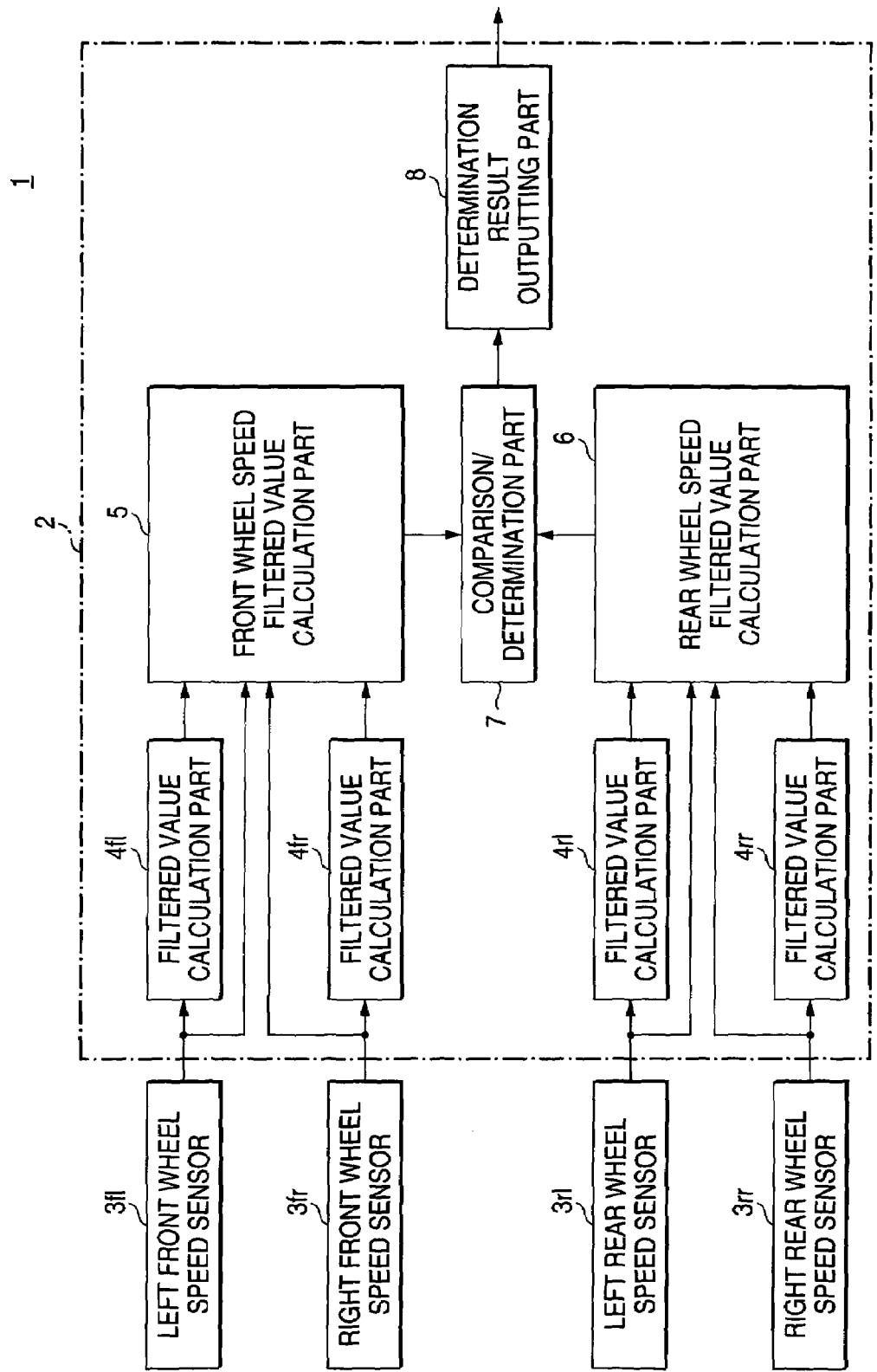
FIG. 1 is a functional block diagram of a road surface determination apparatus.
Figure 2:
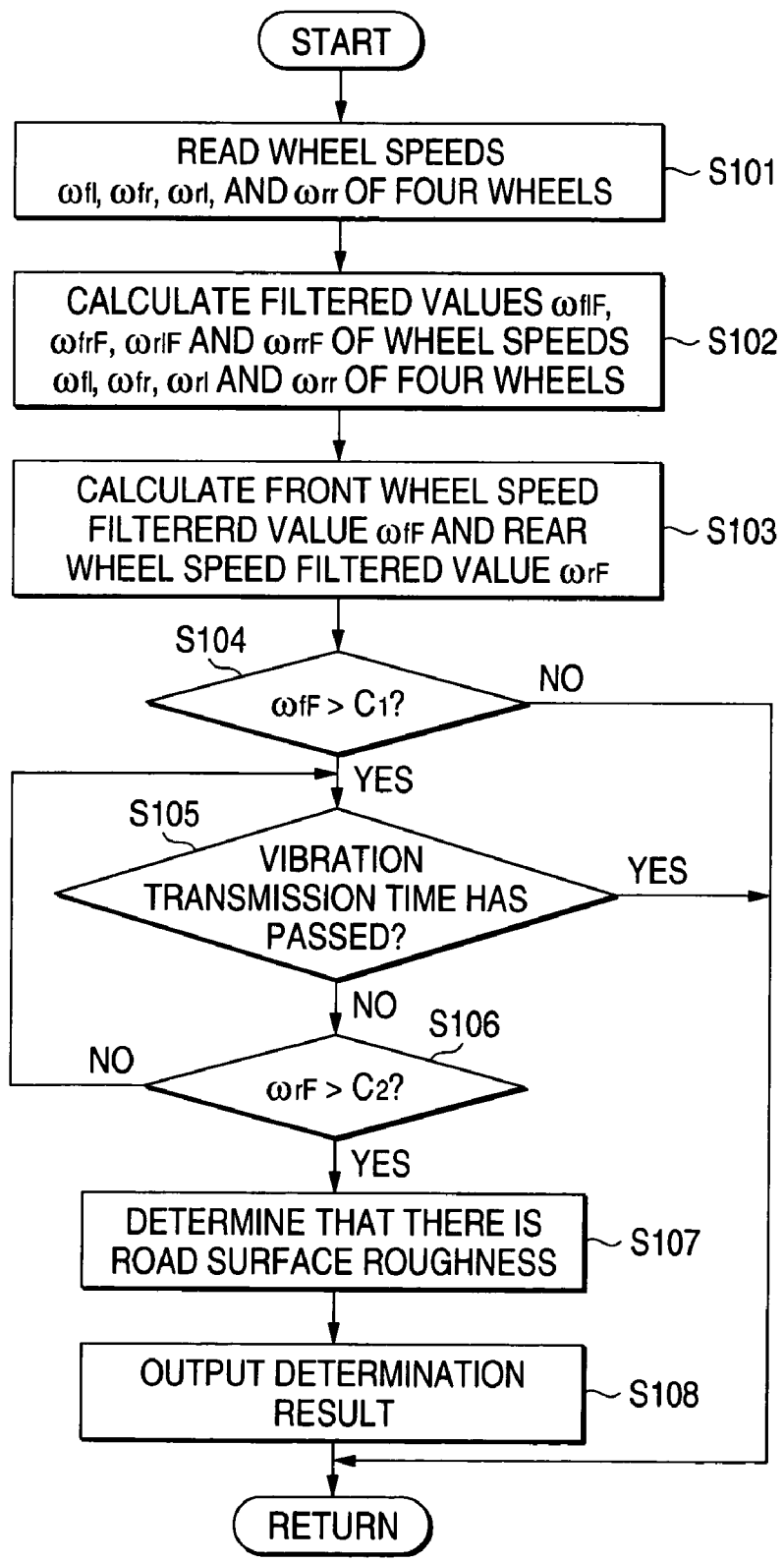
FIG. 2 is a flow chart of a road surface condition determination program executed by the road surface condition determination apparatus.
Figure 3A:
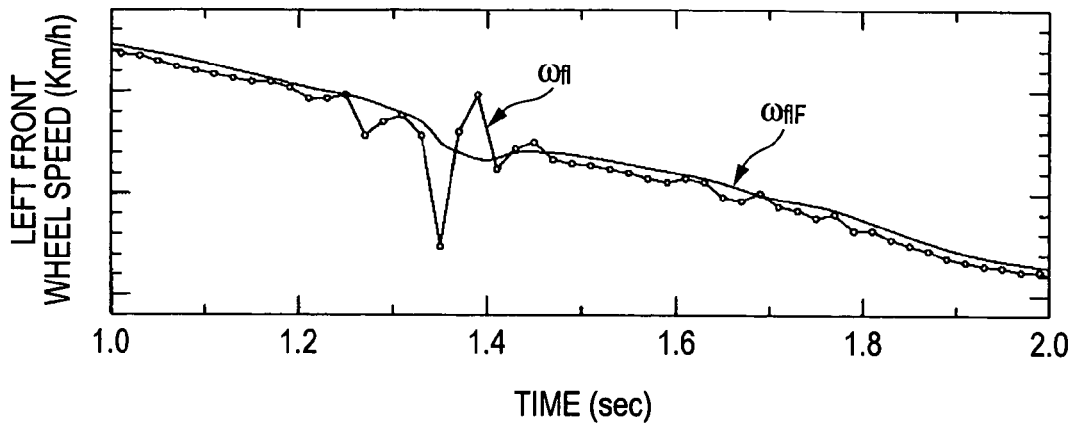
FIGS. 3A to 3C are time charts showing an example in which the presence of a road surface roughness is determined.
Figure 3B:
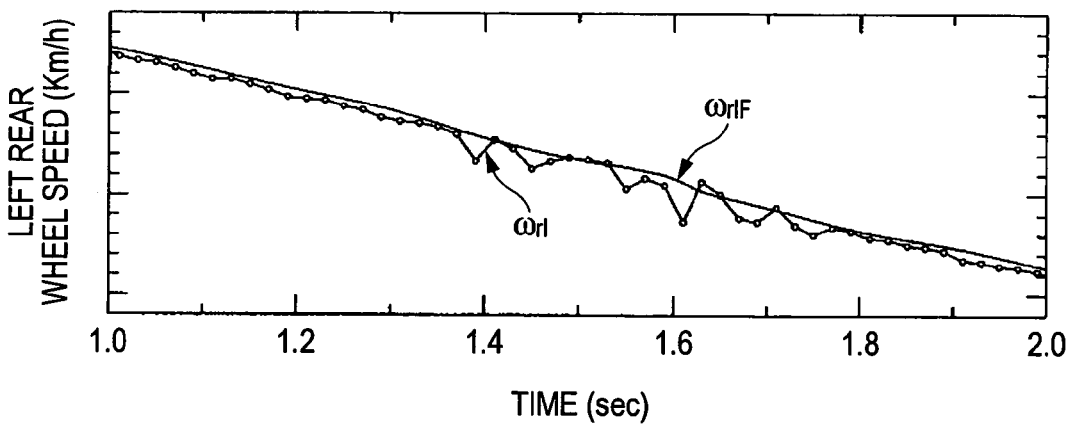
Figure 3C:
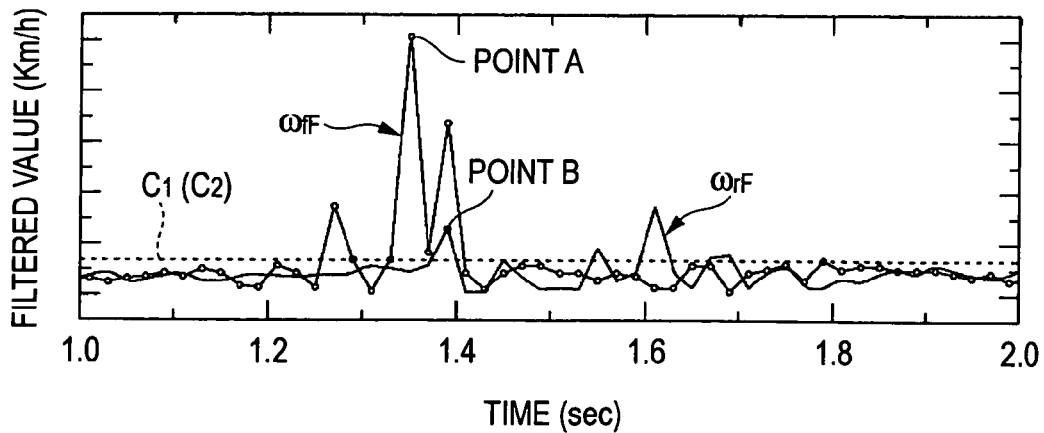

FIGS. 1 to 3C show an embodiment of the invention. FIG. 1 is a functional block diagram of a road surface condition determination apparatus. FIG. 2 is a flow chart of a road surface condition determination program that is executed by the road surface condition determination apparatus. FIGS. 3A to 3C are time charts showing an example in which the presence of a road surface roughness is determined.

Reference numeral 1 in FIG. 1 represents the road surface condition determination apparatus. The road surface condition determination apparatus 1 has a road surface condition determination unit 2 which determines the condition of a road surface according to a road surface condition determination program to be described later and to which wheel speed sensors for four wheels (a left front wheel speed sensor 3fl, a right front wheel speed sensor 3fr, a left rear wheel speed sensor 3rl, and a right rear wheel speed sensor 3rr) as wheel speed detections means are connected to input wheel speeds $\omega fl$, $\omega fr$, $\omega rl$, and $\omega rr$ of the respective wheels.

The road surface condition determination unit 2 is primarily comprised of filtered value calculation parts 4fl, 4fr, 4rl, and 4rr, a front wheel speed filtered value calculation part 5, a rear wheel speed filtered value calculation part 6, a comparison/determination part 7, and a determination result outputting part 8.

The filtered value calculation parts 4fl, 4fr, 4rl, and 4rr receive the input of the wheel speeds $\omega fl$, $\omega fr$, $\omega rl$, and $\omega rr$ from the respective wheel speed sensors 3fl, 3fr, 3rl, and 3rr for the four wheels and calculate filtered values $\omega flF$, $\omega frF$, $\omega rlF$, and $\omega rrF$, respectively using a low-pass filter (which has a cut-off frequency of, for example, 10 Hz). The filtered values $\omega flF$ and $\omega frF$ obtained by the filtered value calculation parts 4fl and 4fr for the front wheels are output to the front wheel speed filtered value calculation part 5. The filtered values $\omega rlF$ and $\omega rrF$ obtained by the filtered value calculation parts 4rl and 4rr for the rear wheels are output to the rear wheel speed filtered value calculation part 6.

The front wheel speed filtering process calculation part 5 is provided as front wheel speed change calculation means to which the front wheel speeds $\omega fl$ and $\omega fr$ are input from the wheel speed sensors 3fl and 3fr for the front wheels and to which the filtered values $\omega flF$ and $\omega frF$ for the front wheels are input from the filtered value calculation parts 4fl and 4fr for the front wheels.

For example, a change in the front wheel speed (a front wheel speed filtered value $\omega fF$) is calculated according to Equation 1 shown below and output to the comparison/determination part 7.

$$\omega fF = ((\omega fl - \omega flF) + (\omega fr - \omega frF))/2 \qquad \text{Equation 1}$$

The rear wheel speed filtering process calculation part 6 is provided as rear wheel speed change calculation means to which the rear wheel speeds $\omega rl$ and $\omega rr$ are input from the wheel speed sensors 3rl and 3rr for the rear wheels and to which the filtered values $\omega rlF$ and $\omega rrF$ for the rear wheels are input from the filtered value calculation parts 4rl and 4rr for the rear wheels.

For example, a change in the rear wheel speed (a rear wheel speed filtered value $\omega rF$) is calculated according to Equation 2 shown below and output to the comparison/determination part 7.

$$\omega rF = ((\omega rl - \omega rlF) + (\omega rr - \omega rrF))/2 \qquad \text{Equation 2}$$

The comparison/determination part 7 receives the input of the front wheel speed filtered value $\omega fF$ from the front wheel speed filtered value calculation part 5 and the rear wheel speed filtered value $\omega rF$ from the rear wheel speed filtered value calculation part 6. Then, the comparison/determination part 7 determines whether the front wheel speed filtered value $\omega fF$ has exceeded a preset first threshold C1. Further, the comparison/determination part 7 determines whether the rear wheel speed filtered value $\omega rF$ has exceeded a preset second threshold C2 within a time for transmission of vibration (e.g., 40 m(sec)) from the front wheels to the rear wheels which is experimentally set in advance after the front wheel speed filtered value $\omega fF$ exceeded the first threshold C1. Further, the comparison/determination part 7 determines that the road surface to be rough when it is determined that the rear wheel speed filtered value $\omega rF$ has exceeded the preset second threshold C2. Then, he comparison/determination part 7 outputs the result of determination to the determination result outputting part 8. That is, the comparison/determination part 6 functions as front wheel speed change determination means, rear wheel speed change determination means, and determination means. The above-described first threshold C1 and second threshold C2 are values set in advance through experiments, and they may be different values or the same value.

Further, the time for transmission of vibration from the front wheels to the rear wheels is much shorter than a period for the rear wheel to reach a position after the front wheel passes the same position.

When the determination result outputting part 8 receives the input of the determination that the road surface is rough, it outputs the result to an apparatus for controlling behaviors of the vehicle, which is not shown, to prevent vehicle behavior control from being conducted based on an incorrect road surface frictional coefficient.

A road surface condition determination program executed by the above-described road surface condition determination part 2 will now be described with reference to the flow chart in FIG. 2. First, at step (hereinafter abbreviated as "S") 101, the wheel speeds $\omega fl$, $\omega fr$, $\omega rl$, and $\omega rr$ of the four wheels detected by the wheel speed sensors 3fl, 3fr, 3rl, and 3rr for the four wheels are read.

The process then proceeds to S102 at which the filtered value calculation parts 4fl, 4fr, 4rl, and 4rr calculate filtered values $\omega flF$, $\omega frF$, $\omega rlF$, and $\omega rrF$ of the wheels speeds $\omega fl$, $\omega fr$, $\omega rl$, and $\omega rr$ of the four wheels.

The process then proceeds S103 at which the front wheel speed filtered value calculation part 5 calculates a front wheel speed filtered value $\omega fF$ according to Equation 1 based on the front wheel speeds $\omega fl$ and $\omega fr$ from the front wheel speed sensors 3fl and 3fr and the filtered values $\omega flF$ and $\omega frF$ for the front wheels from the filtered value calculation parts 4fl and 4fr for the front wheels.

Similarly, the rear wheel speed filtered value calculation part 6 calculates a rear wheel speed filtered value $\omega rF$ according to Equation 2 based on the rear wheel speeds $\omega rl$ and $\omega rr$ from the rear wheel speed sensors 3rl and 3rr and the filtered values $\omega rlF$ and $\omega rrF$ for the rear wheels from the filtered value calculation parts 4rl and 4rr for the rear wheels.

The process then proceeds to S104 at which the comparison/determination part 7 determines whether the front wheel speed filtered value $\omega fF$ has exceeded the preset first threshold C1. The process exits the program when it is determined that the front wheel speed filtered value $\omega fF$ is equal to or smaller than the first threshold C1 ($\omega fF \leq C1$) and proceeds to S105 when it is determined that the front wheel speed filtered value $\omega fF$ is in the excess of the first threshold C1 ($\omega fF > C1$).

At S105, it is determined whether the experimentally preset time (e.g., 40 m(sec)) for transmission of vibration from the front wheels to the rear wheels has passed or not. The process exits the program if the transmission time has passed. If the transmission time has not passed, the process proceeds to S106 at which it is determined whether the rear wheel speed filtered value $\omega rF$ has exceeded the preset second threshold C2 or not.

When the rear wheel speed filtered value $\omega rf$ is equal to or smaller than the second threshold C2 ($\omega rF \leq C2$) as a result of the determination at S106, the process returns to S105 to determine whether the transmission time has passed. If the rear wheel speed filtered value $\omega rF$ is in the excess of the second threshold C2, the process proceeds to S107 at which it is determined that there is a road surface roughness.

The process then proceeds to S108 at which the determination result outputting part 8 outputs a signal indicating the presence of a road surface roughness and exits the program.

An example of the execution of the above-described road surface condition determination program will now be described with reference to the time charts in FIGS. 3A to 3C. FIG. 3A shows a sensor value $\omega fl$ of the speed of a left front wheel and an example of measurement of a filtered value $\omega rlF$ of the same.

FIG. 3B shows a sensor value $\omega rl$ of the speed of a left rear wheel measured in the same flow of time as that in FIG. 3A and an example of measurement of a filtered value $\omega rlF$ thereof.

Further, FIG. 3C shows a front wheel speed filtered value $\omega fF$ and a rear wheel speed filtered value $\omega rF$ calculated in the same flow of time as that in FIGS. 3A and 3B.

Referring to FIG. 3A, the left front wheel speed greatly changes around 1.35 sec, and the change in the wheel speed is indicated by a point A in the excess of the first threshold C1 in FIG. 3C. Referring to FIG. 3B, the left rear wheel speed greatly changes around 1.39 sec, and the change in the wheel speed is indicated by a point B in the excess of the second threshold C2 in FIG. 3C. As a result, it is determined that the road surface is rough because the point B occurs within the transmission time of vibration after the occurrence of the point A.

As thus described, according to the present embodiment, a road surface is determined as a rough road when it is determined that the rear wheel speed filtered value ωrF has exceeded the second threshold C2 within the time of transmission of vibration from the front wheels to the rear wheels (e.g., 40 m(sec) which is set in advance through experiments after the front wheel speed filtered value ωfF exceeded the first threshold C1. It is therefore possible to accurately and quickly determining a roughness of a road surface without any additional sensor or complicated calculation process and without erroneously determining even a road having a low μ as a roughness on a road surface.

While the front wheel speed filtered value ωfF and the rear wheel filtered value ωrF are determined using an average value of the left and right wheels in the present embodiment, it is possible to separately determine a combination of the front wheel speed filtered value and rear wheel speed filtered value on the left-side wheels and a combination of the front wheel speed filtered value and rear wheel speed filtered value on the right-side wheels.

What is claimed is:

1. A road surface condition determination apparatus for a vehicle, comprising:
   wheel speed detection means for detecting wheel speeds;
   front wheel speed change calculation means for calculating a change in the speed of front wheels;
   rear wheel speed change calculation means for calculating a change in the speed of rear wheels;
   front wheel speed change determination means for determining whether the change in the speed of the front wheels exceeds a first preset threshold;
   rear wheel speed change determination means for determining whether the change in the speed of the rear wheels exceeds a second present threshold within a preset time for transmission of vibration from the front wheels to the rear wheels after the change in the speed of the front wheels exceeds the first threshold; and
   determination means for determining that the road surface is rough, when the rear wheel speed change determination means determines that the change in the speed of the rear wheels exceeds the second present threshold.

2. The road surface condition determination apparatus according to claim 1, wherein the change in the speed of the front wheels is at least one of change in the speed of the front wheel on the left side, change in the speed of the front wheel on the right side, and change in the speed of the front wheels averaged between the left and right sides.

3. The road surface condition determination apparatus according to claim 1, wherein the change in the speed of the rear wheels is at least one of change in the speed of the rear wheel on the left side, change in the speed of the rear wheel on the right side, and change in the speed of the rear wheels averaged between the left and right sides.

4. The road surface condition determination apparatus according to claim 1, wherein the preset time for transmission of vibration from the front wheels to the rear wheels is shorter than a period for the rear wheel to reach a position after the front wheel passes the same position.

5. A road surface condition determination apparatus for a vehicle, comprising:
   a wheel speed sensor for detecting wheel speeds;
   a front wheel speed filtered value calculation part for calculating a change in the speed of front wheels;
   a rear wheel speed filtered value calculation part for calculating a change in the speed of rear wheels; and
   a comparison/determination part for determining that the road surface is rough, when a change in the speed of the rear wheels exceeds a second preset threshold within a preset time for transmission of vibration from the front wheels to the rear wheels after a change in the speed of the front wheels exceeds a first preset threshold.

6. The road surface condition determination apparatus according to claim 5, wherein the change in the speed of the front wheels is at least one of change in the speed of the front wheel on the left side, change in the speed of the front wheel on the right side, and change in the speed of the front wheels averaged between the left and right sides.

7. The road surface condition determination apparatus according to claim 5, wherein the change in the speed of the rear wheels is at least one of change in the speed of the rear wheel on the left side, change in the speed of the rear wheel on the right side, and change in the speed of the rear wheels averaged between the left and right sides.

8. The road surface condition determination apparatus according to claim 5, wherein the preset time for transmission of vibration from the front wheels to the rear wheels is shorter than a period for the rear wheel to reach a position after the front wheel passes the same position.

* * * * *